Ǐ US010003681B1

United States Patent
Hsu

(10) Patent No.: US 10,003,681 B1
(45) Date of Patent: Jun. 19, 2018

(54) CELLPHONE SHELL WITH EXTENDING HANDLE FOR IMAGE CAPTURE CONTROL

(71) Applicant: Richard Hsu, Carson, CA (US)

(72) Inventor: Richard Hsu, Carson, CA (US)

(*) Notice: Subject to any disclaimer, the term of this patent is extended or adjusted under 35 U.S.C. 154(b) by 0 days. days.

(21) Appl. No.: 15/660,125

(22) Filed: Jul. 26, 2017

(51) Int. Cl.
*H04W 88/02* (2009.01)
*H04B 1/38* (2015.01)
*H04M 1/06* (2006.01)
*H04B 1/3877* (2015.01)

(52) U.S. Cl.
CPC ............ *H04M 1/06* (2013.01); *H04B 1/3877* (2013.01)

(58) Field of Classification Search
CPC ..... G03B 17/561; G03B 17/563; H04M 1/04; H04M 1/0235; H04B 1/3888; H04B 1/3877; H04B 2001/3861; H04B 1/3883; H04W 88/02
USPC ...................... 455/575.8, 575.6, 575.3, 575.4
See application file for complete search history.

(56) References Cited

U.S. PATENT DOCUMENTS

| 8,636,183 B1* | 1/2014 | Steiner .................... B60R 11/02 224/483 |
| D715,791 S | 10/2014 | Yu |
| 9,473,190 B1* | 10/2016 | Sandlofer ............ H04B 1/3888 |
| 9,473,608 B1* | 10/2016 | Sherman ................. H04M 1/21 |
| 2013/0176412 A1 | 7/2013 | Chen |
| 2013/0293731 A1 | 11/2013 | Kim |
| 2014/0031095 A1 | 1/2014 | Herrera et al. |
| 2014/0124521 A1 | 5/2014 | Brown |
| 2015/0029352 A1 | 1/2015 | Burciaga |
| 2016/0337492 A1* | 11/2016 | Tseng .................. H04M 1/0264 |
| 2017/0085284 A1* | 3/2017 | Ai ......................... H04B 1/3888 |
| 2017/0220068 A1* | 8/2017 | Youlios ................. G06F 1/1618 |

FOREIGN PATENT DOCUMENTS

WO    WO2013191314    12/2013

* cited by examiner

*Primary Examiner* — Philip Sobutka

(57) ABSTRACT

A cellphone accessory device for capturing a self-portrait image includes a shell that is configured to couple to a cellphone. A slot is positioned in a back of the shell. A handle is coupled to the shell and is positioned in the slot. The handle comprises a plurality of nested sections so that it is selectively extensible from the slot. A controller is coupled to the handle and is configured to operationally couple to the cellphone. The handle is configured to extend from the shell to position the shell distal from a hand that is grasping the handle. The controller is configured to compel the cellphone to selectively capture an image, such as a photograph and a video.

12 Claims, 4 Drawing Sheets

CELLPHONE SHELL WITH EXTENDING HANDLE FOR IMAGE CAPTURE CONTROL

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

Figure 1:
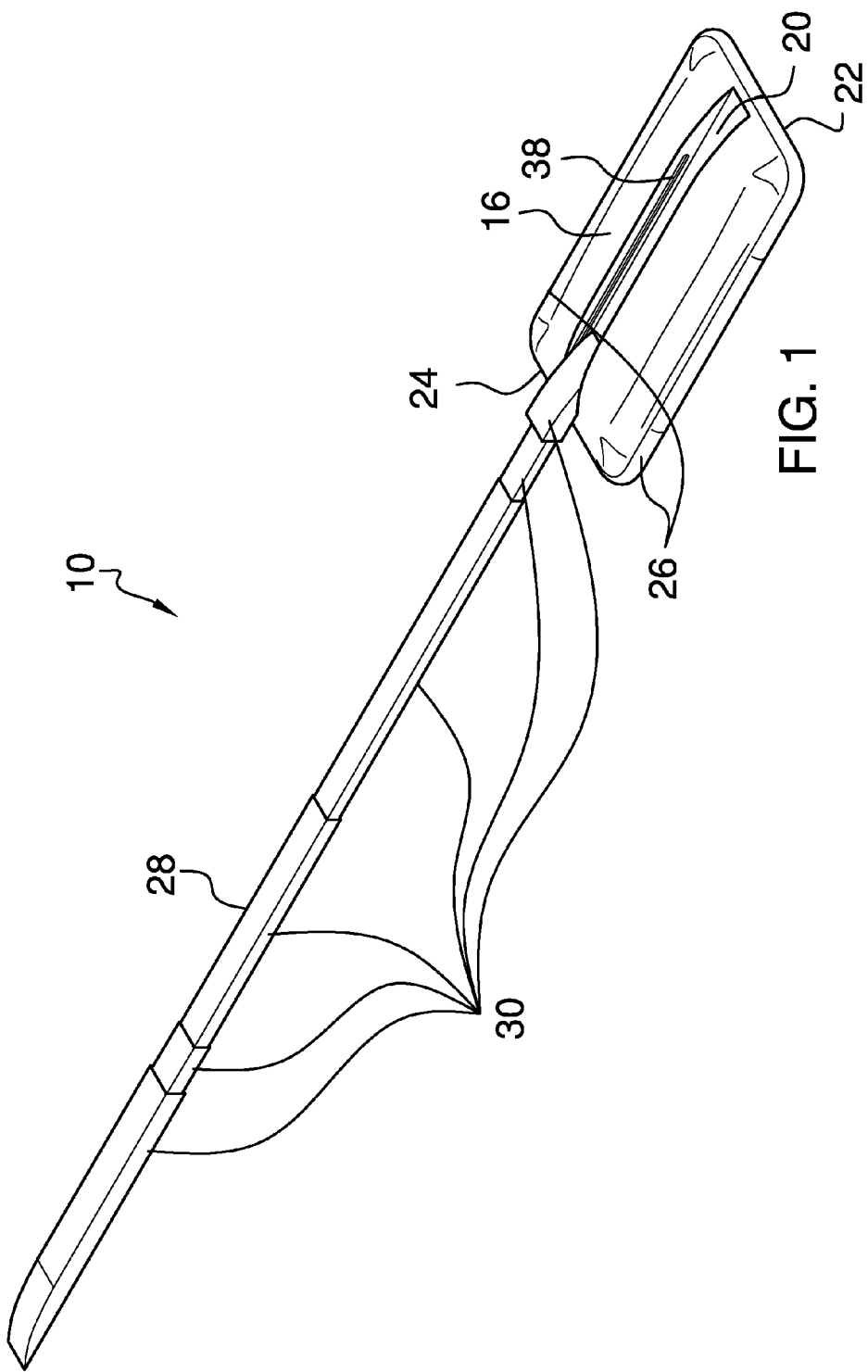

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to accessory devices and more particularly pertains to a new accessory device for capturing a self-portrait image.

BRIEF SUMMARY OF THE INVENTION

An embodiment of the disclosure meets the needs presented above by generally comprising a shell that is configured to couple to a cellphone. A slot is positioned in a back of the shell. A handle is coupled to the shell and is positioned in the slot. The handle comprises a plurality of nested sections so that it is selectively extensible from the slot. A controller is coupled to the handle and is configured to operationally couple to the cellphone. The handle is configured to extend from the shell to position the shell distal from a hand that is grasping the handle. The controller is configured to compel the cellphone to selectively capture an image, such as a photograph and a video.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is an isometric perspective view of a cellphone accessory device according to an embodiment of the disclosure.

Figure 2:
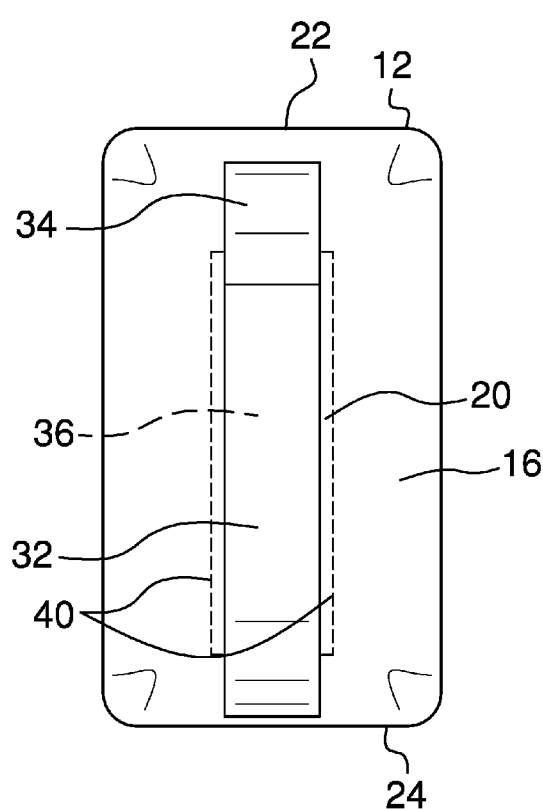
Figure 3:
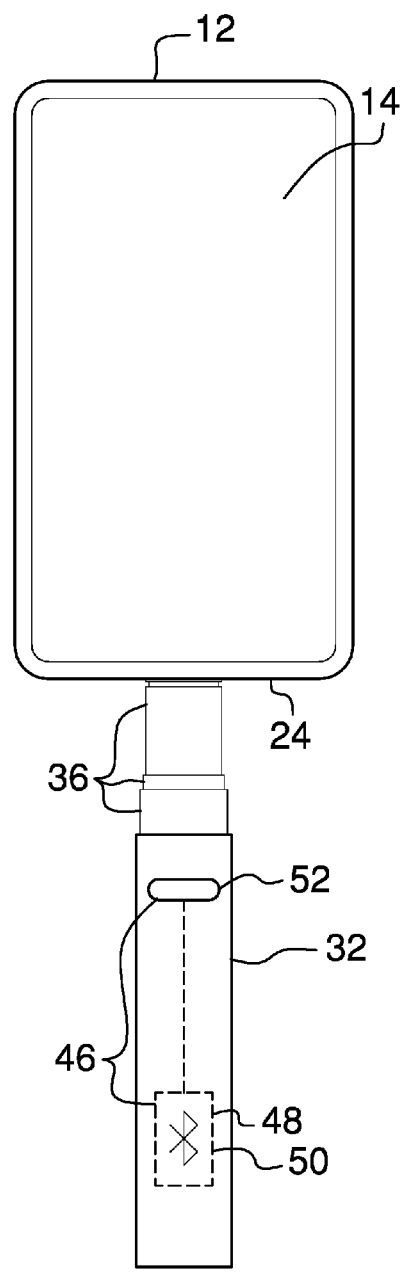
Figure 4:
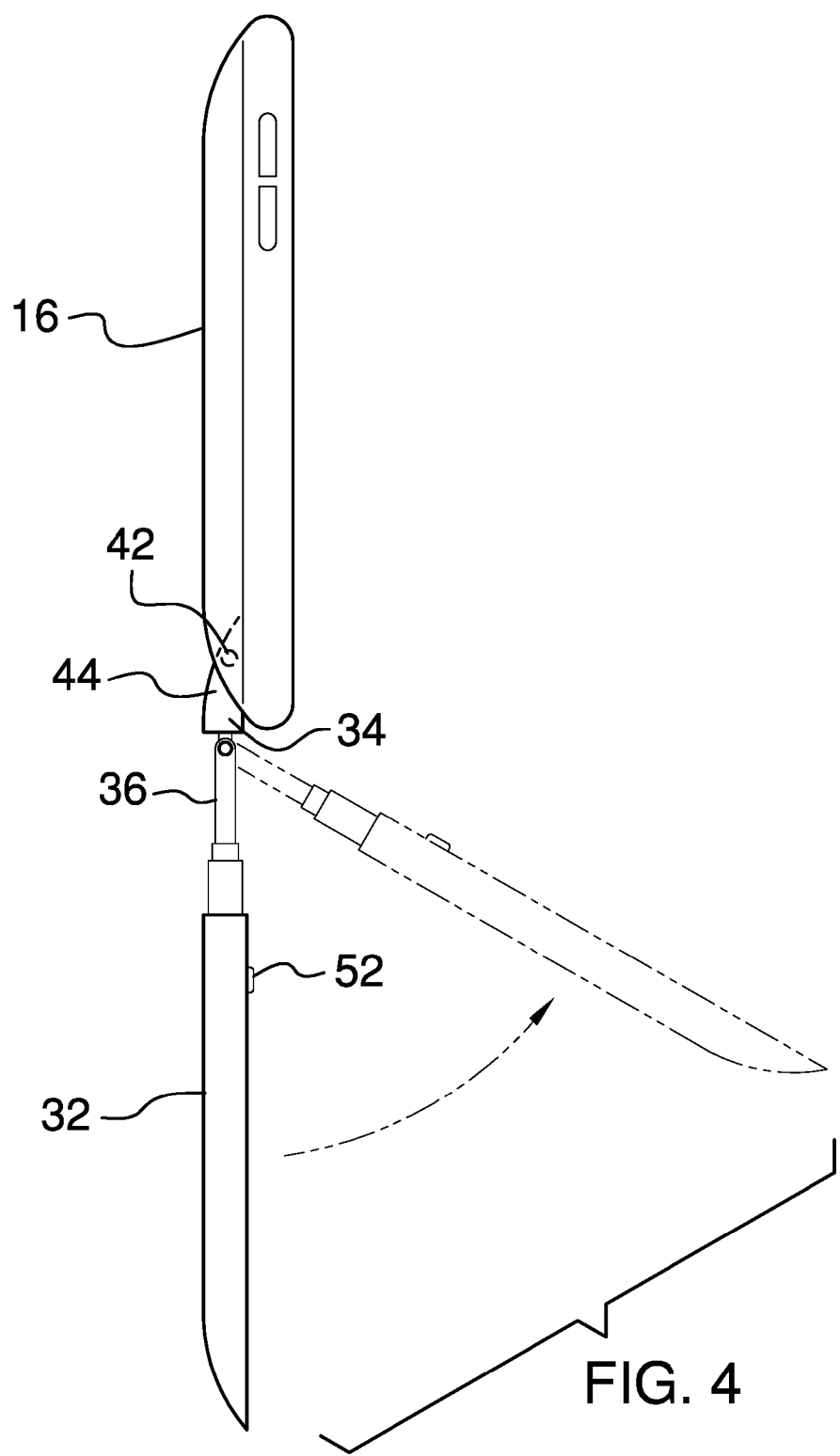
Figure 5:
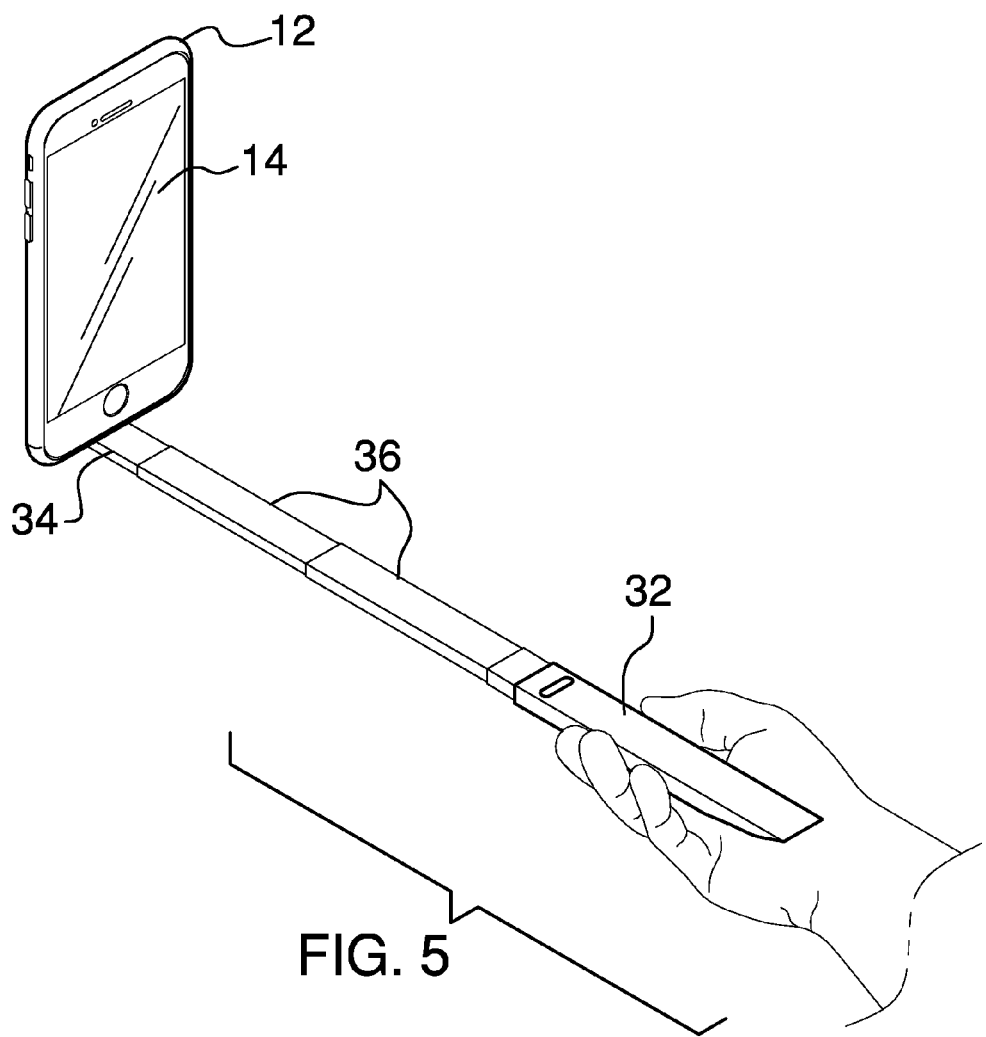

FIG. 2 is a back view of an embodiment of the disclosure.
FIG. 3 is a front view of an embodiment of the disclosure.
FIG. 4 is a side view of an embodiment of the disclosure.
FIG. 5 is an in-use view of an embodiment of the disclosure.

DETAILED DESCRIPTION OF THE INVENTION

With reference now to the drawings, and in particular to FIGS. 1 through 5 thereof, a new accessory device embodying the principles and concepts of an embodiment of the disclosure and generally designated by the reference numeral 10 will be described.

As best illustrated in FIGS. 1 through 5, the cellphone accessory device 10 generally comprises a shell 12 that is configured to couple to a cellphone. The shell 12 has a front 14 that is open. The shell 12 is configured to insert the cellphone through the front 14 into the shell 12 to couple the shell 12 to the cellphone. The shell 12 has a back 16 that extends arcuately from an annular wall 18. The back 16 is dimensionally smaller than the front 14.

A slot 20 is positioned in the back 16 of the shell 12. The slot 20 extends from a top 22 to a bottom 24 of the shell 12. The slot 20 is positioned equally distant from opposing sides 26 of the shell 12.

A handle 28 is coupled to the shell 12 and is positioned in the slot 20. The handle 28 comprises a plurality of nested sections 30 so that the handle 28 is selectively extensible from the slot 20. The handle 28 is configured to extend from the shell 12 to position the shell 12 distal from a hand that is grasping the handle 28.

The plurality of nested sections 30 comprises a first segment 32, a second segment 34, and a plurality of medial segments 36 that is positioned between the first segment 32 and the second segment 34. In one embodiment, the medial segments 36 are extensible from the first segment 32. In another embodiment, the plurality of medial segments 36 comprises four medial segments 36. In yet another embodiment, the first segment 32 and the second segment 34 together are shaped complementarily to the slot 20. In still yet another embodiment, the second segment 34 is hingedly coupled to an adjacent medial segment 36 so that the handle 28 is selectively pivotable relative to the shell 12.

Each of a pair of channels 38 is positioned longitudinally in a respective opposing wall 40 of the slot 20. Each of a pair of pins 42 is coupled to a respective opposing face 44 of the second segment 34 and extends into an associated channel 38. Each pin 42 is positioned to slide within the associated channel 38 so that the handle 28 is slidably coupled to the shell 12.

A controller 46 is coupled to the handle 28. The controller 46 is configured to operationally couple to the cellphone.

The controller 46 is configured to compel the cellphone to selectively capture an image, such as a photograph and a video. In one embodiment, the controller 46 is coupled to the first segment 32. In another embodiment, the controller 46 comprises at least one battery 48 that is coupled to the handle 28 and is positioned in the first segment 32. A transmitter 50 is coupled to the handle 28 and is positioned in the first segment 32. The transmitter 50 is operationally coupled to the at least one battery 48. The transmitter 50 is configured to wirelessly couple to the cellphone. A button 52 is coupled to the first segment 32. The button 52 is operationally coupled to the transmitter 50. The button 52 is configured to be depressed to compel the transmitter 50 to communicate a command to the cellphone. The cellphone is compelled capture the image. In yet another embodiment, the transmitter 50 is Bluetooth-enabled.

In use, the shell 12 is configured to insert the cellphone through the front 14 into the shell 12 to couple the shell 12 to the cellphone. Each pin 42 that is positioned on the second segment 34 is positioned to slide within the associated channel 38 so that the handle 28 is slidably coupled to the shell 12. The handle 28 is configured to extend from the shell 12 to position the shell 12 distal from the hand that is grasping the handle 28. The second segment 34 is hingedly coupled to the adjacent medial segment 36 so that the handle 28 is selectively pivotable relative to the shell 12. The button 52 is configured to be depressed to compel the transmitter 50 to communicate the command to the cellphone. The cellphone is compelled to capture the image, such as the photograph and the video.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cellphone accessory device comprising:
   a shell configured for coupling to a cellphone;
   a slot positioned in a back of said shell;
   a handle coupled to said shell and positioned in said slot, said handle comprising a plurality of nested sections, said plurality of nested sections comprising a first segment, a second segment, and a plurality of medial segments positioned between said first segment and said second segment, said medial segments being extensible from said first segment, said second segment being slidably coupled to said shell such that sliding said second segment within said slot extends said handle from said shell, said second segment being hingedly coupled to an adjacent said medial segment such that said plurality of medial segments and said first segment are pivotable relative to said shell;
   a controller coupled to said handle, said controller being configured for operationally coupling to the cellphone coupled to said shell; and
   wherein said handle is positioned in said slot such that said handle is configured for extending from said shell positioning said shell distal from a hand grasping said handle, wherein said controller is positioned on said handle such that said controller is configured for compelling the cellphone for selectively capturing an image, such as a photograph and a video.

2. The device of claim 1, further including said shell having a front, said front being open such that said shell is configured for inserting the cellphone through said front into said shell for coupling said shell to the cellphone.

3. The device of claim 2, further including said back of said shell extending acutely from an annular wall such that said back is dimensionally smaller than said front.

4. The device of claim 3, further including said slot extending from a top to a bottom of said shell.

5. The device of claim 3, further including said slot being positioned equally distant from opposing sides of said shell.

6. The device of claim 1, further including said plurality of medial segments comprising four said medial segments.

7. The device of claim 1, further including said first segment and said second segment together being shaped complementarily to said slot.

8. The device of claim 1, further comprising:
   a pair of channels, each said channel being positioned longitudinally in a respective opposing wall of said slot;
   a pair of pins, each said pin being coupled to a respective opposing face of said second segment and extending into an associated said channel; and
   wherein said pins are positioned on said second segment such that each said pin is positioned for sliding within said associated said channel such that said second segment is slidably coupled to said shell.

9. The device of claim 1, further including said controller being coupled to said first segment.

10. The device of claim 9, further including said controller comprising:
    at least one battery coupled to said handle and positioned in said first segment;
    a transmitter coupled to said handle and positioned in said first segment, said transmitter being operationally coupled to said at least one battery, said transmitter being configured for wirelessly coupling to the cellphone positioned in said shell;
    a button coupled to said first segment, said button being operationally coupled to said transmitter; and
    wherein said button is positioned on said handle such that said button is configured for depressing for compelling said transmitter for communicating a command to the cellphone such that the cellphone is compelled for capturing the image.

11. The device of claim 1, further including said transmitter being Bluetooth-enabled.

12. A cellphone accessory device comprising:
    a shell configured for coupling to a cellphone, said shell having a front, said front being open such that said shell is configured for inserting the cellphone through said front into said shell for coupling said shell to the cellphone, said shell having a back extending acutely from an annular wall such that said back is dimensionally smaller than said front;

a slot positioned in said back of said shell, said slot extending from a top to a bottom of said shell, said slot being positioned equally distant from opposing sides of said shell;

a handle coupled to said shell and positioned in said slot, said handle comprising a plurality of nested sections, wherein said handle is positioned in said slot such that said handle is configured for extending from said shell positioning said shell distal from a hand grasping said handle, said plurality of nested sections comprising a first segment, a second segment, and a plurality of medial segments positioned between said first segment and said second segment, said medial segments being extensible from said first segment, said plurality of medial segments comprising four said medial segments, said first segment and said second segment together being shaped complementarily to said slot, said second segment being slidably coupled to said shell such that sliding said second segment within said slot extends said handle from said shell, said second segment being hingedly coupled to an adjacent said medial segment such that said plurality of medial segments and said first segment are pivotable relative to said shell;

a pair of channels, each said channel being positioned longitudinally in a respective opposing wall of said slot;

a pair of pins, each said pin being coupled to a respective opposing face of said second segment and extending into an associated said channel, wherein said pins are positioned on said second segment such that each said pin is positioned for sliding within said associated said channel such that said handle is slidably coupled to said shell;

a controller coupled to said handle, said controller being configured for operationally coupling to the cellphone coupled to said shell, wherein said controller is positioned on said handle such that said controller is configured for compelling the cellphone for selectively capturing an image, such as a photograph and a video, said controller being coupled to said first segment, said controller comprising:

at least one battery coupled to said handle and positioned in said first segment, a transmitter coupled to said handle and positioned in said first segment, said transmitter being operationally coupled to said at least one battery, said transmitter being configured for wirelessly coupling to the cellphone positioned in said shell, said transmitter being Bluetooth-enabled, and a button coupled to said first segment, said button being operationally coupled to said transmitter, wherein said button is positioned on said handle such that said button is configured for depressing for compelling said transmitter for communicating a command to the cellphone such that the cellphone is compelled for capturing the image; and wherein said shell is configured for inserting the cellphone through said front into said shell for coupling said shell to the cellphone, wherein said pins are positioned on said second segment such that each said pin is positioned for sliding within said associated said channel such that said handle is slidably coupled to said shell, wherein said handle is positioned in said slot such that said handle is configured for extending from said shell positioning said shell distal from the hand grasping said handle, wherein said second segment is hingedly coupled to said adjacent said medial segment such that said handle is selectively pivotable relative to said shell, wherein said button is positioned on said handle such that said button is configured for depressing for compelling said transmitter for communicating the command to the cellphone such that the cellphone is compelled for capturing the image, such as the photograph and the video.

\* \* \* \* \*